United States Patent Office 3,137,284
Patented June 16, 1964

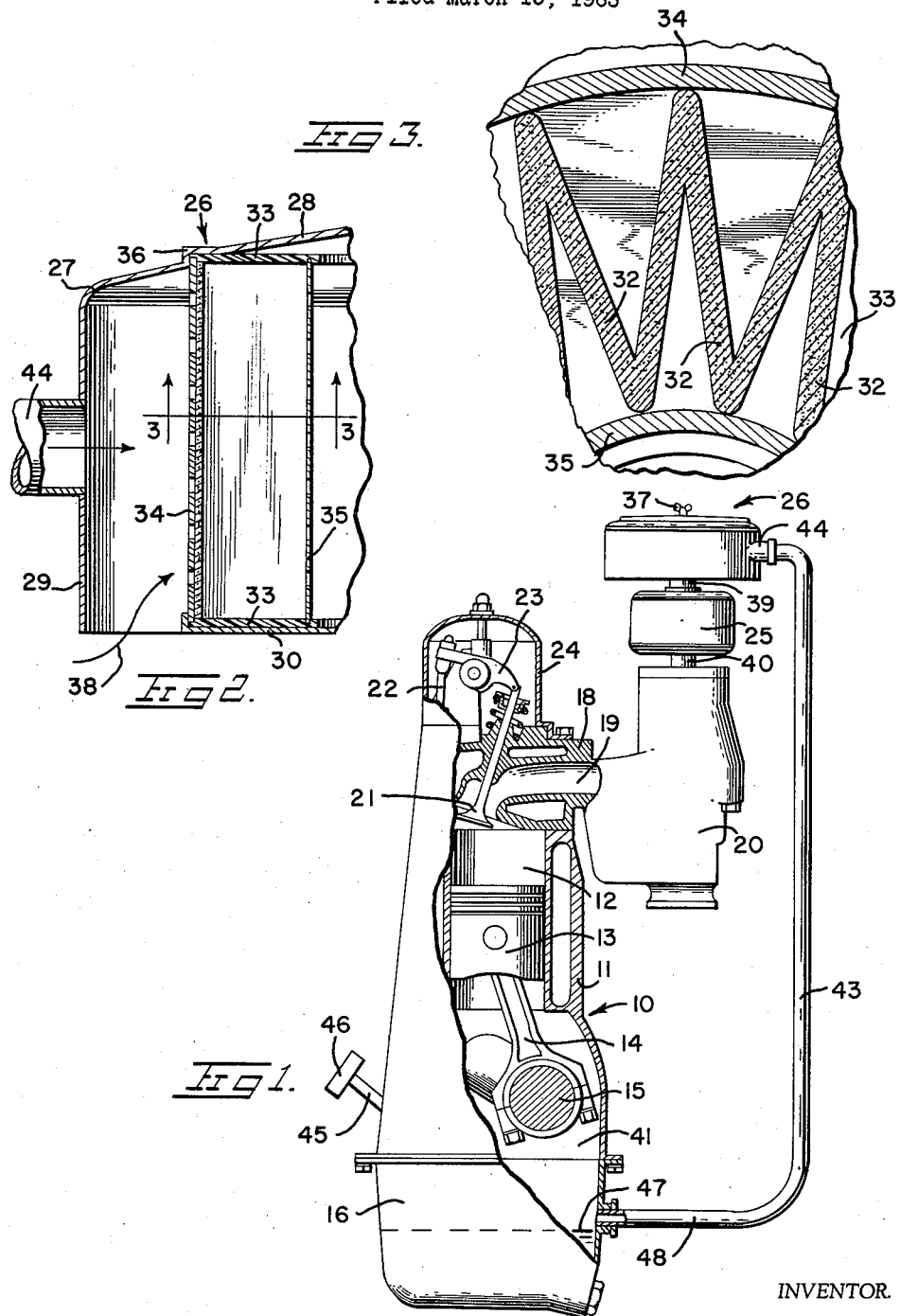

3,137,284
CRANK CASE VENTILATING SYSTEM AND AIR CLEANER MEANS
William H. Hultgren, Mount Carmel, Ill., assignor to Champion Laboratories, Inc., West Salem, Ill., a corporation of Connecticut
Filed Mar. 13, 1963, Ser. No. 264,796
13 Claims. (Cl. 123—119)

The present invention relates to an internal combustion engine and more particularly to a crank case ventilating system therefor and air cleaner means for filtering the air to support combustion and for filtering the air that is returned to the engine from the crank case.

It is an object of the present invention to provide means for disposing of the gases entering the crank case of an internal combustion engine and the like by returning them through the carburetor air cleaner into the engine so that there will be no pollution of the atmosphere which is caused by dumping the fumes from the crank case directly into the atmosphere.

Because of the constantly increased air pollution throughout major cities and parts of the country with increased hazards to health by virtue of the fact that the persons are breathing in contaminated air, particularly in industrial cities, a concerted effort is being made to control and regulate the sources and causes of pollution of the air and atmosphere. One major source of pollution in cities and certain geographic areas in the country is the exhaust from vehicles, and with the constant increase in vehicles on the road this source of contamination is increasing.

In connection with the exhaust fumes from internal combustion engines and particularly vehicles the exhaust fumes from the crank case of the vehicles contains what is known as blow-by gases which include unburned hydrocarbon and this is one of the major sources of the crank case fumes contribution to air pollution. Accordingly, in order ot restrict and reduce the vehicle hydrocarbon emissions from vehicles several of the States are in the process of passing laws to require these unburned hydrocarbons be delivered back to the air intake manifold of the engine so as to be introduced back into the cylinders of the engine to be completely burned therein. The State of California has already passed such a law and it is mandatory that all new vehicles sold in the State be equipped with some means for returning the blow-by gases from the crank case back into the air induction system of the engine for complete combustion of the blow-by gases which heretofore have been dumped into the atmosphere to add to the pollution of it.

In accordance with the State of California motor vehicle pollution control board requirement, emission of crank case fumes to the atmosphere must not exceed 0.15% of the fuel consumed. The blow-by gases are generally defined as the gases and vapors which leak from between the pistons and the cylinder walls down into the crank case of the engine located therebelow.

In returning the blow-by gases from the crank case to the air induction system of the internal combustion engine, there is provided a connection between the engine crank case chamber and the air induction system of the carburetor so that the blow-by gases are circulated from the crank case chamber through the air filter normally associated with the air supply to the carburetor. The carburetor in turn supplies clean air through the intake manifold of the engine for admission to the cylinders of the engine. Thus, with the system of communicating the crank case chamber with the upstream side of the air cleaner or air cleaner element of the carburetor system, the air cleaner element serves the dual purpose of filtering the air supply to the carburetor and the engine as well as filtering out of the air other contaminants such as varnishes, tars, heavy ends of gasoline, and entrained oil and oil particles, from the crank case chamber. It is necessary to filter the air being supplied to the carburetor and the induction system as the contaminants previously mentioned and dirt and other airborne particles are detrimental to the proper functioning of the carburetor and the induction system.

The blow-by gases and fumes from the crank case chamber are readily circulated back to the air cleaner or air element for supplying clean air to the carburetor because of the difference of pressure between the crank case chamber and the manifold intake which maintains a constant circulation of gases and air from the crank case chamber into the intake manifold of the engine.

At the present time the air cleaner or air element for supplying clean air to the carburetor and the induction system in wide use is a resin impregnated pleated paper filter element. The resin with which the pleated paper is impregnated is generally phenol formaldehyde. The filter element is generally shaped as an annulus with the paper in zigzag pleats extending generally radially of the annulus with the opposite of the ends of the pleated paper sealed by plastic end caps such as a vinyl resin generally referred to as plastisol which is a very efficient filter and is a positive type filter, as distinguished from the older wetback type filter element which was a mass of steel wool oil wetted so that contaminants in the air passed through the filter would adhere to the oil particles on the steel wool mass or else impinge in the oil reservoir located below the mass of steel wool material.

It has been found that where the resin impregnated pleated paper filter for filtering air to the carburetor of an internal combustion engine also serves the dual purpose of filtering the air supply to the carburetor and the blow-by gases and fumes from the crank case that are returned to the carburetor and air induction system of the engine the filter has become quickly clogged because of the oil entrained particles carried in the fumes from the crank case chamber and from the varnishes, tars, and heavy ends of gasoline and water particles that are also entrained in the fumes.

It is an object of the present invention to provide a crank case ventilating system for internal combustion engines and air cleaner means for serving the dual purpose of filtering the outside air and the blow-by gases and fumes from the crank case chamber which air cleaner means will not be unduly clogged due to the contaminants from the crank case chamber wicking and crawling along the fibers of the pleated paper filter elements so as to block off the air cleaner elements and unduly restricting the flow of air to the carburetor of the engine.

It is another object of the present invention to provide a crank case ventilating system for returning blow-by gases and fumes from the crank case chamber to the upstream side of the carburetor air cleaner means and to provide an air cleaner element which will permit the passage of vapors therethrough while preventing the penetration of oil, varnishes, tars, and heavy ends of gasoline therethrough.

It is another object of the present invention to provide an air cleaner element for use in a crank case ventilating system which air cleaner element serves the dual purpose of filtering outside air to the carburetor and filtering fumes from the crank case chamber which has a water repellency, provides resistance to penetration of oil and grease and permits the passage of vapors therethrough while preventing the clogging or restriction of the pores in the filter paper by oil particles and water particles and the like.

It is another object of the present invention to provide a crank case ventilation system for an internal combustion engine wherein an air cleaner is provided for the dual purpose of filtering contaminants including dirt particles and the like from air supplied to the carburetor as well as filtering the fumes from the crank case chamber which are returned to the carburetor and induction system of the engine while preventing the penetration thereof by oil, water, varnish, tars and other particles and the blocking or clogging of the pores in the filter element.

Another object of the present invention is to provide an air filter for an internal combustion engine and the like consisting of resin impregnated paper material for filtering dirt and contaminants from air supplied to the carburetor as well as filtering fumes from the crank case chamber of the engine which are recirculated to the air intake or upstream side of the air filter of the carburetor wherein the air filter is treated with an oleophobic sizing agent which makes the resin impregnated paper material repellant to oils and water and highly resistant to the penetration of said liquids.

It is another object of the present invention to provide a resin impregnated paper filter for filtering the air to the carburetor of an internal combustion engine which paper material is treated with an oleophobic material which prevents wicking of the paper fibers, and permits passage of air and vapors while preventing oil penetration of the air filter elements.

It is another object of the present invention to provide an air filter for a carburetor of an internal combustion engine which air filter serves the dual purpose of filtering fumes from the crank case chamber of the internal combustion engine recirculated to the carburetor to be burned in the cylinders, rather than dumping the fumes into the atmosphere, and which air filter element is treated with an oleophobic sizing agent or material so that the filter will remove the airborne dirt load from the air supplied to the carburetor as well as prevent the penetration of any oil and water particles from the crank case chamber and will not permit the oil or water particles to wick along the fibers of the air filter element to cause it to become clogged or decrease its porosity.

It is another object of the present invention to provide an air filter element for the air carburetor of an internal combustion engine made of resin impregnated paper material which is treated with an oleophobic fluorocarbon sizing agent which will maintain the porosity of the paper to permit the proper filtering of vapors and air and which will prevent the penetration of oil particles and the wicking thereof along the paper fibers without forming a continuous film to mechanically impede the passage of oil and grease particles and the like.

It is another object of the present invention to provide an air filter element for an internal combustion engine which serves the dual purpose of filtering the air supplied to the carburetor and crank case chamber fumes recirculated from the crank case chamber to the upstream side of the air filter which air filter element is made of resin impregnated paper material and which is treated with an oleophobic fluorocarbon sizing agent to prevent the penetration of the paper by oil particles and other liquid particles from the crank case chamber, and which further prevents the wicking of the fibers in the paper material to maintain the original porosity of the paper material, and which oleophobic fluorocarbon sizing agent may be applied to the resin impregnated paper material by applying it on the paper machine, by spraying the sizing agent solution on the sheet after it is well formed, or by immersing the paper in the sizing agent solution.

It is another object of the present invention to provide a resin impregnated paper air filter element for an internal combustion engine treated with an oleophobic fluorocarbon sizing agent or material so that the air filter element can serve the dual purpose of filtering the air to be supplied to the engine and fumes from the crank case chamber recirculated to the upstream side of the air filter element which will prevent the oil particles from the crank case chamber and particularly the SAE weight oils used in an internal combustion engine from penetrating the air filter element and crawling or wicking along the paper fibers so that the porosity of the paper filter is not reduced to unduly shorten the serviceable life of the air filter element.

Various other objects and advantages of the present invention will be readily apparent from the following detailed description when considered in connection with the accompanying drawing forming a part thereof and in which, FIGURE 1 is an elevational view of an internal combustion engine, with parts broken away and in section, and the air ventilating and cleaning means of the present invention, FIGURE 2 is a fragmentary enlarged detail view of the air cleaner embodied in the present invention, and FIGURE 3 is an enlarged fragmentary section taken along lines 3—3 of FIGURE 2.

Referring to the drawing, the reference numeral 10 generally designates an internal combustion engine which includes a cylinder block structure 11. The cylinder block structure is provided with cylinder bores 12 in which are disposed reciprocating pistons 13. The pistons 13 are connected by means of conventional connecting rods 14 to a crack shaft 15 for driving the pistons 13. While the invention is described in connection with an inline type engine having six cylinder bores, it is to be understood that the invention could be applied to a V-type internal combustion engine, an eight cylinder engine or any other desired type. Suitably secured to the lower marginal edge of the cylinder block structure 11 is an oil pan 16 which is adapted to contain lubricating oil and serve as an oil reservoir for the engine lubricating system.

A cylinder head 18 is secured to the uppermost surface of the cylinder block structure 11 and is provided with an air intake inlet or passage 19 for supplying air and fuel to the cylinder bores 12 from an intake manifold 20. An intake valve 21 is disposed in each intake inlet for controlling the admission of air and fuel to the cylinder bore from the intake manifold. Similarly mounted in the head 18 are exhaust valves, not shown, for permitting the flow of exhaust gases from the cylinder bores 12 to an exhaust manifold, not shown.

The air intake valves 21 are operatively connected to tappets or pushrods 22 through rocker arm assemblies 23 for actuating the intake valve 21 in a conventional manner. The tappets 22 in turn are actuated by a rotatable cam shaft, not shown, driven by the crank shaft 15 by means of a pair of meshing gears, not shown, secured to the cam shaft and crank shaft respectively, all of which means are conventional and well known. The tappets 22 and rocker arm assemblies 23 are enclosed within a head cover member 24 suitably secured to the cylinder block head 18.

The engine carburetor 25 is suitably secured on top of the intake manifold 20 and communicates therewith so as to supply a mixture of air and fuel to the air intake inlet 19 of the cylinder bores 12. An air cleaner or air cleaner means 26 is suitably secured to the carburetor 25 and has its downstream side in communication therewith so as to supply air from the outside thereto.

The air cleaner means 26 consists of a cylindrical housing or casing 27 as best shown in FIGURE 2 with a top wall 28 and a vertical side wall or shroud 29 and a lower annular plate member or support member 30 between which is disposed an air filter or cartridge or air filter element 31.

The air filter element 31 comprises a plurality of zig zag pleats 32 as best seen in FIGURE 3 disposed in an annulus configuration with the pleats 32 extending in a generally radial direction. The top and bottom edges of the pleats are embedded in an annular plastic end cap 33 and perforated cylindrical members 34 and 35 are disposed adjacent the outer and inner ends of the pleats as best shown in FIGURE 2 and also have their opposite edges embedded in the plastic end caps 33 to provide strength to the filter elements. The filter element 31 is seated on the plate member 30 and the casing 27 is disposed over the top of the filter element and is provided with a shoulder or annular rib 36 therein for seating on top of the upper end cap 33. The casing 27 is secured to the air cleaner by well known means and is preferably secured by a wing nut shown in FIGURE 1 and designated 37 to a bolt not shown secured to the inlet of the carburetor. It will be noted that the side wall 29 of the casing 27 has an internal diameter substantially larger than the outside diameter of the filter element 31 and the plate member 30 so that an annular air inlet passage 38 is provided for admitting fresh air to the carburetor in the direction indicated by the arrow in FIGURE 2. Thus, air is admitted to the cylinders of the internal engine by passing through the annular inlet 38 of the filter element and thereafter flowing through the pleated paper filter element after which it is discharged into the carburetor 25 through an inlet connection 39 in communication with the downstream side of the filter element 31 and the upstream or inlet side of the carburetor 25. From the carburetor 25 the air then passes through connection 40 into the intake manifold 20 and then on into the cylinder bores 12 through the air intake inlets 19.

The pleated paper air filter element is impregnated with phenol formaldehyde resin solution which is well known in the art of filter paper for internal combustion engines. The crank case chamber 41 of the internal combustion engine is defined by the lower portion of the cylinder block structure 11 and the oil pan 16 and communicates with the annular air inlet passage 38 in the air cleaner through a conduit or pipe 43 having its lower end disposed in the oil pan and its upper end connected to an inlet connection 44 disposed in the side wall 29 of the casing 27. The crank case chamber 41 is also provided with an oil filler pipe 45 disposed in the side thereof provided with a conventional removable cap member 46 in which is disposed a conventional air filter for adding oil to the crank case oil when necessary and permitting the crank case chamber to breathe and permit ventilation of the crank case chamber. It will be noted that the filler tube 45 is disposed above the normal liquid level of the oil indicated at 47 in the crank case chamber and that the lower end 48 of the recirculation conduit 43 is also disposed above this liquid oil level 47 so that the crank case fumes can be readily recirculated back to the air cleaner 26 without causing oil in the bottom of the oil pan from being pulled through the conduit 43 therewith.

Inasmuch as each of the six cylinder bores 12 opens into the crank case chamber 41, the gas or vapor which inevitably leaks between the pistons 13 and the cylinder bores 12 during the operation of the engine accumulate within the crank case chamber 41, and would be exhausted to the atmosphere through the filler tube or pipe 45 and the breather filter cap 46, except that the recirculation conduit or pipe 43 now causes these gases and vapors and fumes to be pulled back into the air inlet passage 38 of the air cleaner with the incoming fresh air to the carburetor 25 after passing through the resin impregnated pleated paper filter element 31 so that the unburned hydrocarbons are again sent through the induction system to be burned in the cylinders, rather than dumping these fumes into the atmosphere to cause pollution thereof.

The current of air or fumes through the crank case chamber is developed by establishing the communication between the crank case chamber interior and a source of vacuum or subatmospheric pressure. This is accomplished by utilizing the suction existing in the engine intake manifold or the carburetor air intake.

Thus, in the present invention the vented blow-by gases that enter the crank case chamber 41 from the cylinder bores are pulled through the recirculation line 43 to the air cleaner 26 entering the air inlet 38 through the inlet connection 44 in the direction of the arrow shown in FIGURE 2 while fresh air is supplied to the carburetor through the air inlet 38 from the atmosphere. This is accomplished as soon as the engine is started since the pressure in the engine intake manifold will drop from atmospheric pressure to a subatmospheric pressure, while the pressure in the crank case chamber being continually in communication with air under atmospheric pressure will remain substantially at atmospheric pressure. As a result of this low pressure or high vacuum condition in the intake manifold fresh air will be continuously supplied to the intake manifold and the crank case fumes or gases will be continually pulled into the air cleaner. The provision of the crank case filler 45 and crank case breather cap 46 will also cause a small amount of air to enter the crank case chamber from the atmosphere to provide scavenging air flowing through the crank case chamber.

When the fresh air from the atmosphere and crank case gases enter the air cleaner they will pass through the pleated paper filter elements and have dirt and other airborne contaminants and entrained oil particles from the crank case and any other entrained particles from the crank case filtered out by the paper filter so that only clean air enters the carburetor and is discharged into the intake manifold and the cylinder bores.

In accordance with the present invention the pleated paper filter element is treated with an oleophobic sizing agent or material so that the oil particles and other liquid particles from the crank case will permit the passage of gases through the filter element while preventing oil penetrating thereof, and will prevent wicking of the paper fibers so that the entrained oil particles and the like do not reduce the porosity of the filter paper to impede the passage of air and gases therethrough. This permits the paper filter element which is impregnated with resin to serve the dual purpose of filtering the air from the atmosphere to the carburetor as well as permitting the unburned hydrocarbons in the crank case gases to be returned to the cylinders for burning therein to reduce pollution and contamination of the atmosphere from the unburned hydrocarbon and other crank case fumes heretofore dumped directly into the atmosphere. The resin impregnated pleated paper filter element is treated with a relatively small quantity of stable oleophobic fluorocarbon sizing agent or material applied to the paper as a suitably dilute solution or dispersion in a volatile liquid vehicle so that, upon drying the paper is rendered stably oleophobic. The treated paper is thus rendered repellent to light fraction oils and particularly SAE weight oils commonly used in engines as lubricating oil.

One example of oleophobic sizing agents as a class are the fluorocarbon compounds which are chemically characterized by having in the molecule one or more highly fluorinated or perfluorinated terminal chains or side chains serving as fluorocarbon "tails." The "tails" are both oleophobic and hydrophobic, in contrast to a corresponding hydrocarbon chain, which is oleophilic. A polymeric molecule will include a large number of fluorocarbon "tails."

The sizing compound is applied to filter paper as a dilute compound or dispersion preferably in water, although some or all of the water may be replaced by a volatile organic solvent or dispersant. Upon drying, a minute coating is provided on the paper. In most instances, the resultant dried coating is invisible on the paper surface, even upon microscopic examination. In fact, indications are that the layer is substantially of monomolecular thickness. Thus, the coating has a fluorocarbon-like characteristic that renders it both hydrophobic and oleophobic.

Preferred oleophobic fluorocarbon sizing agents are fluorocarbon monocarboxylic acids and certain derivatives thereof. Preferred fluorocarbon monocarboxylic acids are the perfluoroalkanesulfonamide alkylenemonocarboxylic acids, e.g. N-methyl, N-perfluorooctanesulfonyl glycine, which have a fluorocarbon "tail" at one end of the molecule and a functional polar carboxylic "head" group at the other end of the molecule, the groups being linked together by an interposed sulfonamidealkylene "body" group.

Having now generally described our invention, the following non-limitative example of a preferred embodiment will more specifically illustrate the same. Unless otherwise indicated, amounts are listed in parts by weight.

*Example 1*

A slurry of N-methyl, N-perfluorooctanesulfonyl glycine, $C_8F_{17}SO_2N(CH_3)CH_2COOH$, was prepared by adding 0.5 part by weight of the acid to about 5 parts by weight of a vehicle consisting of 80 percent by weight of water and 20 percent isopropyl alcohol. The acid was just neutralized with concentrated ammonium hydroxide solution, during which time solution was effected. Additional water-isopropyl alcohol vehicle was then added to bring the total weight of solution to 100 parts and thereby to reduce the concentration to 0.5 percent solids.

The resin impregnated pleated paper air filter is preferably treated with the oleophobic fluorocarbon sizing agent or material having a concentration in the range of 0.5% solids by weight to 1.0% solids by weight. The oleophobic fluorocarbon sizing agent is a water soluble fluorochemical which upon drying, by a chemical reaction, converts it from a water soluble material to a water resistant, insoluble, nonvolatile material and when dried on the resin impregnated filter paper produces a surface which is repellent to oils and water and highly resistant to the penetration of such liquids. The sizing agent can be applied on the paper machine, or during converting operations, or the oleophobic fluorocarbon solution may be sprayed on the sheet after it is formed. It can also be applied to the resin impregnated filter paper material by passing the paper through squeeze rolls to remove the excess treating solution and drying it in any convenient manner such as air drying at room temperature which is entirely satisfactory. The resulting resistance to oil and water can be varied by merely changing the concentration of the treating solution as desired. No additional heat is required beyond that necessary to dry the treated filter paper sheet and maximum properties are developed by the time that the filter paper sheet reaches its wind up reel. The treatment of the resin impregnated filter paper, as commonly used in air filters for carburetors of internal combustion engines with the oleophobic fluorocarbon sizing agent or material converts the water soluble oleophobic fluorocarbon sizing agent to a water resistant insoluble non-volatile material upon drying and renders the treated filter paper oleophobic or oil repellant and hydrophobic or water repellant.

In operation of the present invention the air filter element 31 which consists of a resin impregnated pleated paper material treated with an oleophobic fluorocarbon sizing agent filters the entrained oil particles and other liquid particles in the crank case chamber that are recirculated through the conduit 43 while permitting the unburned hydrocarbon vapors to pass into the carburetor, and also filters the incoming fresh air from the atmosphere so that any dirt contaminants contained in the airborne stream collect on the upstream or inlet side of the pleated paper air filter element and permits only clean air to be supplied to the internal combustion engine carburetor and the unburned hydrocarbons in the blow-by gases. The oil entrained particles from the crank case chamber and any liquid particles in the crank case fumes such as varnishes, tars, and heavy ends of gasoline are prevented from passing through the filter paper without reducing the porosity thereof such as occurred heretofore by the entrained oil and liquid particles crawling and wicking along the fibers of the paper filter elements.

Thus the present invention provides an air ventilating system for an internal combustion engine in which the air filter element or air cleaner therein serves the dual purpose of filtering atmospheric or outside air supplied to the carburetor and gases from the crank case chamber into the upstream side of the air filter for discharge into the induction system of the engine so as to burn the unburned hydrocarbons without unduly clogging and restricting the air filter element and reducing the air pollution of the atmosphere caused heretofore by dumping the crank case fumes including the unburned hydrocarbons into the atmosphere.

The present invention further provides a pleated paper filter element which is impregnated with phenolic resin and treated with oleophobic fluorocarbon sizing material which enables the air filter element to perform the air cleaning function normally associated with the air carburetor induction system of an internal combustion engine and permits the air filter element to filter the crank case chamber fumes for recirculation into the carburetor of the internal combustion engine without causing the porosity of the air filter element to be decreased and the air filter element to become clogged due to crawling and wicking of the liquid particles entrained in the crank case chamber fumes.

While specific embodiments of the invention have been disclosed, variations in the structural details within the scope of the appended claims are possible and are contemplated. There is no intention, therefore, of limitation to the exact details shown and described.

What is claimed is:

1. In combination, an internal combustion engine with crankcase chamber means, air cleaner means for filtering air supplied to the internal combustion engine conduit means communicating with the crankcase chamber means and said air cleaner means for returning blow-by gases to the engine said air cleaner means including a paper filter element treated with an oleophobic fluorocarbon material to prevent oil and other liquid particles from the crankcase chamber from clogging and penetrating said filter element.

2. In combination, an internal combustion engine with a crankcase chamber, a carburetor for supplying a mixture of fuel and air to the engine, air cleaner means in communication with said carburetor for supplying clean air therefor, conduit means communicating with said crankcase chamber and said air cleaner means to return blow-by gases to said engine, and a paper filter element in said air cleaner means treated with an oleophobic fluorocarbon material to prevent wicking of the paper element by entrained oil and liquid particles in the gases returned from said crankcase chamber.

3. The combination of claim 2 wherein said paper filter element is a pleated annulus impregnated with phenolic resin.

4. An air filter element for the carburetor of an internal combustion engine for filtering air supplied to the carburetor and for filtering out entrained liquid particles from the crankcase fumes of the engine comprising resin impregnated paper material treated with a stable minute water insoluble coating of oleophobic fluorocarbon material.

5. The air filter element of claim 4 wherein said filter element comprises a pleated annulus of paper material.

6. The method of providing an air filter element for filtering air to a carburetor of an internal combustion engine and filtering crankcase fumes recirculated to the carburetor comprising taking a resin impregnated paper filter element and treating it with an oleophobic fluorocarbon sizing agent.

7. The method of claim 6 wherein said paper element is treated by spraying a solution of oleophobic fluorocarbon agent on the paper and drying it.

8. The method of claim 6 wherein said paper element is treated by immersing it in a solution of the oleophobic fluorocarbon sizing agent and then drying it.

9. The method of filtering the air supply to a carburetor of an internal combustion engine and filtering crankcase fumes returned to the engine for reburning comprising passing a first stream of atmospheric air through a resin impregnated paper filter element treated with a coating of oleophobic fluorocarbon sizing agent and flowing the filtered air into the carburetor of the engine passing another stream of gas from the crankcase chamber of the engine into said filter element and flowing the filtered gas together with said air into the carburetor of the engine.

10. The method of claim 9 wherein a subatmospheric pressure is maintained on the filter element to pull said air and said gas through said filter element.

11. An air filter element for filtering air supplied to the carburetor of an internal combustion engine and serving the dual purpose of filtering crankcase fumes returned to the engine for reburning unburned hydrocarbons comprising a porous fibrous pleated paper annulus with annular end caps sealing off the opposite edges of the pleats, said pleated paper being impregnated with phenolic resin and having a coating of oleophobic fluorocarbon sizing material dispersed thereon.

12. The filter element of claim 11 wherein said sizing material consists of a solid concentration of between 0.5 percent and 1.0 percent solids by weight when dried.

13. The method of filtering the air supply to a carburetor of an internal combustion engine and filtering crankcase fumes returned to the engine for reburning comprising passing a first stream of atmospheric air through a resin impregnated paper filter element treated with a coating of oleophobic sizing agent and flowing the filtered air into the carburetor of the engine passing another stream of gas from the crankcase chamber of the engine into said filter element and flowing the filtered gas together with said air into the carburetor of the engine.

References Cited in the file of this patent

UNITED STATES PATENTS

| | | |
|---|---|---|
| 2,633,113 | McCarty | Mar. 31, 1953 |
| 2,731,958 | Robley | Jan. 24, 1956 |
| 2,895,868 | Magill | July 21, 1959 |
| 2,936,855 | Allen | May 17, 1960 |
| 2,973,832 | Cook | Mar. 7, 1962 |
| 3,053,762 | Adiletta | Sept. 11, 1962 |